United States Patent
Sheila-Vadde et al.

(10) Patent No.: US 9,909,911 B2
(45) Date of Patent: Mar. 6, 2018

(54) MULTIPHASE FLOW MEASUREMENT USING ELECTROMAGNETIC SENSORS

(71) Applicant: General Electric Company, Schenectady, NY (US)

(72) Inventors: Aparna Chakrapani Sheila-Vadde, Bangalore (IN); Prafull Sharma, Bangalore (IN); Manoj Kumar Koyithitta Meethal, Bangalore (IN); Vikram Reddy Melapudi, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 860 days.

(21) Appl. No.: 14/294,215

(22) Filed: Jun. 3, 2014

(65) Prior Publication Data

US 2014/0260659 A1    Sep. 18, 2014

Related U.S. Application Data

(63) Continuation-in-part of application No. 12/916,149, filed on Oct. 29, 2010, now Pat. No. 8,855,947.

(Continued)

(51) Int. Cl.
*G01F 1/74* (2006.01)
*G01F 1/66* (2006.01)
*G01F 1/712* (2006.01)

(52) U.S. Cl.
CPC .................. *G01F 1/74* (2013.01); *G01F 1/66* (2013.01); *G01F 1/662* (2013.01); *G01F 1/712* (2013.01)

(58) Field of Classification Search
CPC ... G01F 1/74; G01F 1/66; G01F 1/662; G01F 1/712

(Continued)

(56) References Cited

U.S. PATENT DOCUMENTS

| 4,062,010 A | 12/1977 | Young et al. |
| 4,902,961 A | 2/1990 | De et al. |

(Continued)

FOREIGN PATENT DOCUMENTS

| CN | 101103256 A | 1/2008 |
| CN | 101548179 A | 9/2009 |

(Continued)

OTHER PUBLICATIONS

European Search Report and Written Opinion issued in connection with related EP Application No. 11153061.4 dated Nov. 8, 2016.

(Continued)

*Primary Examiner* — Mohamed Charioui
(74) *Attorney, Agent, or Firm* — Nitin N. Joshi

(57) ABSTRACT

A method for determining a phase composition of a multiphase mixture flowing through a pipe is presented. The method includes exciting one or more patch antennas configured to operate over the range of frequencies. Further, the method includes acquiring at least one of a transmitted signal and a reflected signal over the range of frequencies from the one or more patch antennas. Moreover, the method includes estimating the phase composition of the multiphase mixture based on a group delay determined from at least one of the transmitted signal and the reflected signal. A system for determining a phase composition of a multiphase mixture flowing through a pipe is also presented.

19 Claims, 11 Drawing Sheets

Related U.S. Application Data

(60) Provisional application No. 61/302,381, filed on Feb. 8, 2010.

(58) Field of Classification Search
USPC .................................................... 702/45, 49
See application file for complete search history.

(56) References Cited

U.S. PATENT DOCUMENTS

| | | | |
|---|---|---|---|
| 5,025,222 | A | 6/1991 | Scott et al. |
| 5,101,163 | A | 3/1992 | Agar |
| 5,103,181 | A | 4/1992 | Gaisford et al. |
| 5,485,743 | A * | 1/1996 | Taherian ............... G01N 22/00 324/637 |
| 5,675,259 | A | 10/1997 | Arndt et al. |
| 5,741,979 | A * | 4/1998 | Arndt ..................... G01F 1/74 324/639 |
| 7,135,872 | B2 | 11/2006 | Bentolila et al. |
| 7,293,471 | B2 | 11/2007 | Lund Bo et al. |
| 7,456,744 | B2 | 11/2008 | Kuhns et al. |
| 7,469,188 | B2 | 12/2008 | Wee |
| 8,468,871 | B2 | 6/2013 | Potyrailo et al. |
| 2002/0050828 | A1 | 5/2002 | Seward, IV et al. |
| 2004/0233458 | A1 | 11/2004 | Frick |
| 2005/0264302 | A1* | 12/2005 | Mohajer ............... G01N 22/00 324/639 |
| 2008/0087099 | A1* | 4/2008 | Allenberg .............. G01F 1/662 73/861.08 |
| 2008/0192827 | A1 | 8/2008 | Beric et al. |
| 2008/0319685 | A1 | 12/2008 | Xie et al. |
| 2009/0126502 | A1* | 5/2009 | Wee ........................ G01F 1/44 73/861.04 |
| 2010/0148804 | A1 | 6/2010 | Jakoby et al. |
| 2011/0196625 | A1 | 8/2011 | Sheila-Vadde et al. |
| 2011/0290035 | A1 | 12/2011 | Wee et al. |
| 2011/0301877 | A1 | 12/2011 | Wee et al. |
| 2015/0097579 | A1 | 4/2015 | Sharma et al. |

FOREIGN PATENT DOCUMENTS

| | | |
|---|---|---|
| JP | 6128095 B2 | 6/1986 |
| JP | 04500857 A | 2/1992 |
| JP | 05502718 A | 5/1993 |
| JP | 2000249673 A | 9/2000 |
| JP | 2002214183 A | 7/2002 |
| JP | 2008538433 A | 10/2008 |
| JP | 2009537824 A | 10/2009 |
| JP | 2009538433 A | 11/2009 |
| JP | 2010510523 A | 4/2010 |
| WO | 200077501 A1 | 12/2000 |
| WO | 2008069670 A1 | 6/2008 |
| WO | 2008127429 A2 | 10/2008 |

OTHER PUBLICATIONS

LF Chen et al., "Transmission/Reflection methods", microwave electronics—measurement and materials characterisation, Jan. 1, 2004.

S. R. Wylie et al., "RF sensor for multiphase flow measurement through an oil pipeline," Institute of Physics Publishing, Measurement Science and Technology, vol. No. 17, pp. 2141-2149, 2006.

Unofficial English Translation of Japanese Office Action issued in connection with corresponding JP Application No. 2011-020275 dated Oct. 21, 2014.

Unofficial English Translation of Japanese Office Action issued in connection with corresponding JP Application No. 2011-020275 dated Mar. 17, 2015.

PCT Search Report and Written Opinion issued in connection with corresponding PCT Application No. PCT/US2015/030346 dated Aug. 17, 2015.

S.R. Wylie et al.;RF sensor for multiphase flow measurement through an oil pipeline; Institute of Physics Publishing, Measurement Science and Technology, vol. 17, 2006, pp. 2141-2149.

Unofficial English translation of Office Action issued in connection with corresponding CN Application No. 201110078762.X dated Jan. 22, 2014.

U.S. Appl. No. 61/302,381, filed Feb. 8, 2010, Aparna Chakrapani Sheila-Vadde.

U.S. Appl. No. 12/916,149, filed Oct. 29, 2010, Aparna Chakrapani Sheila-Vadde.

* cited by examiner

MULTIPHASE FLOW MEASUREMENT USING ELECTROMAGNETIC SENSORS

CROSS-REFERENCE TO RELATED APPLICATIONS

This application is a continuation-in-part of U.S. patent application Ser. No. 12/916,149, entitled "MULTIPHASE FLOW METERING WITH PATCH ANTENNA" filed on Oct. 29, 2010, which is herein incorporated by reference. Also, this application claims priority to U.S. Patent Application Ser. No. 61/302,381, filed Feb. 8, 2010, which is hereby incorporated by reference.

BACKGROUND

The present disclosure relates generally to measurement of a multiphase mixture, and more specifically to use of patch antennas in the measurement of a multiphase mixture flowing in a pipe.

A multiphase mixture refers to a composition that includes at least two phases of material. By way of example, the multiphase mixture may include some combination of oil, water, and gas. Typically, in oil and gas industries, it is desirable to measure a composition and a flow rate of a material flowing inside a pipe. With depleting oil/gas reserves across the globe and smaller and deeper wells with higher water content, there is an enhanced need for multiphase flow measurement techniques.

Conventionally, for measuring a composition of fluids in the oil and gas industry, a variety of techniques are employed. For example, impedance sensors, capacitive and/or inductive sensors, dual-energy gamma sensors, venturi meters, and microwave sensors have been used for measuring the composition of the fluids. Currently, numerous microwave-based flow metering sensors are being employed. These microwave-based flow metering sensors offer varying degrees of sensitivity, complexity, and costs.

Furthermore, some of the microwave-based flow metering sensors are intrusive to the flow inside the pipe. Consequently, these sensors may be exposed to the flow of the material inside the pipe, thereby increasing possibility of damage to the sensors and necessitating frequent replacement. In other scenarios, the flow of the material may be measured by diverting the actual flow of material inside the pipe through an external flow circuit. In certain other scenarios, a flow separator or a flow mixer may be used. Also, with the currently available microwave-based flow metering sensors accuracy of the measurement is a major concern.

BRIEF DESCRIPTION

In accordance with aspects of the present disclosure, a method for determining a phase composition of a multiphase mixture flowing through a pipe is presented. The method includes exciting one or more patch antennas configured to operate over a range of frequencies. Further, the method includes acquiring at least one of a transmitted signal and a reflected signal over the range of frequencies from the one or more patch antennas. Moreover, the method includes estimating the phase composition of the multiphase mixture based on a group delay determined from at least one of the transmitted signal and the reflected signal.

In accordance with another aspect of the present disclosure, a method for determining a phase composition of a multiphase mixture flowing through a pipe is presented. The method includes acquiring a low frequency impedance measurement of the multiphase mixture using one or more patch antennas as electrodes. Also, the method includes determining at least one of a conductivity and a permittivity of the multiphase mixture based on the low frequency impedance measurement. In addition, the method includes estimating the phase composition of the multiphase mixture based on at least one of the conductivity and the permittivity of the multiphase mixture.

In accordance with yet another aspect of the present disclosure, a system for determining a phase composition of a multiphase mixture flowing through a pipe is presented. The system includes one or more patch antennas disposed on or about the pipe. The system also includes a controller configured to excite the one or more patch antennas at one or more frequencies, acquire at least one of a transmitted signal and a reflected signal corresponding to the one or more frequencies, and estimate the phase composition of the multiphase mixture based on one or more of an amplitude, a phase, and a group delay determined from at least one of the transmitted signal and the reflected signal.

In accordance with yet another aspect of the present disclosure, a method of measuring a multiphase mixture flowing through a pipe is presented. The method includes disposing at least two sets of patch antennas on or about the pipe, where one set of patch antennas is disposed axially at a determined distance from the other set of patch antennas. Further, the method includes exciting the at least two sets of patch antennas over a range of frequencies. Also, the method includes measuring power at the at least two sets of patch antennas. Additionally, the method includes estimating a velocity of flow of the multiphase mixture based on the power measured at the at least two sets of patch antennas.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
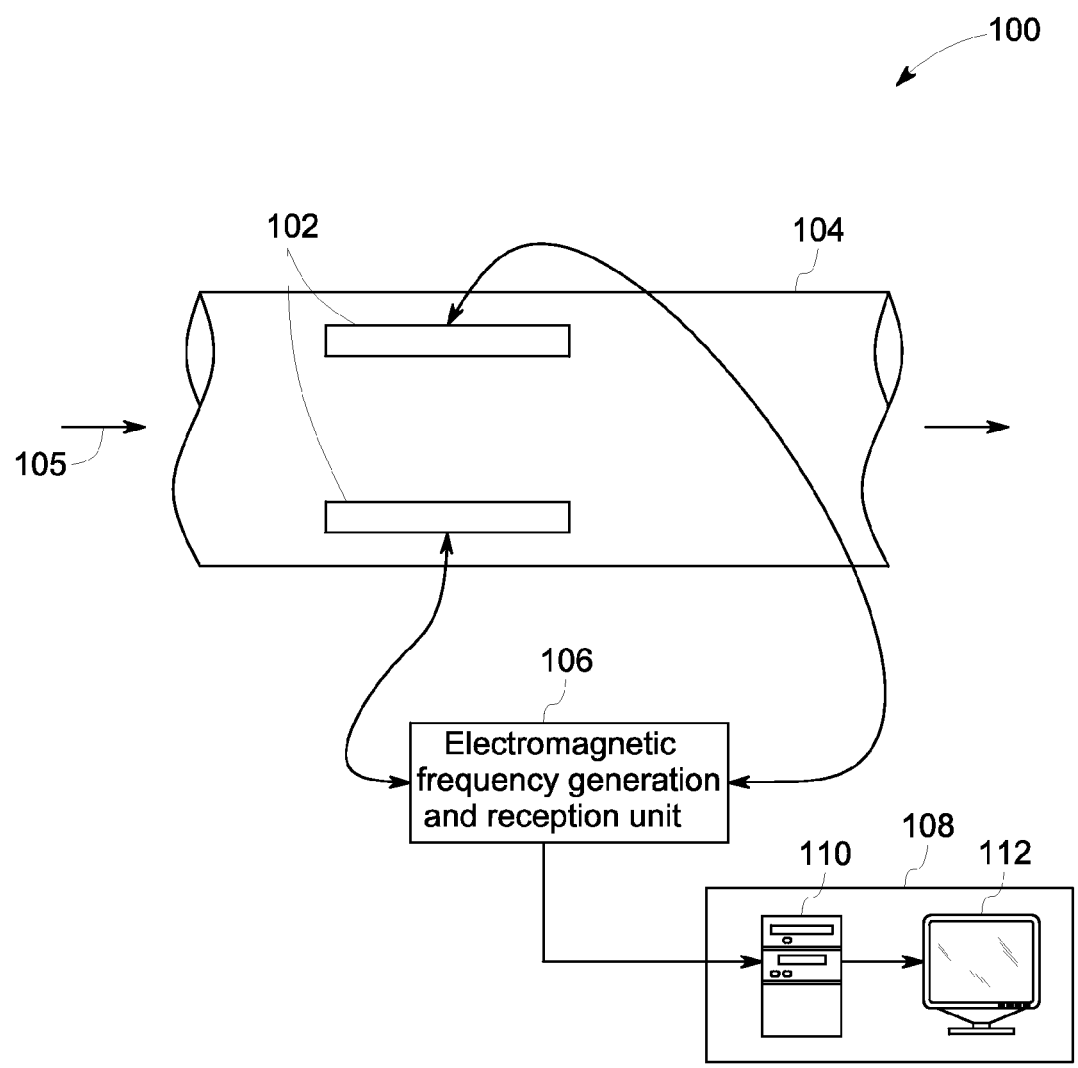
FIG. 1 is a diagrammatical representation of a multiphase flow measurement system using patch antennas, according to aspects of the present disclosure.

As will be described in detail hereinafter, various embodiments of an exemplary system and method for multiphase mixture measurement are presented. Specifically, systems and methods for the measurement of a multiphase mixture employing patch antennas are presented. According to aspects of present disclosure, a non-intrusive, non-contact system and method of metering the multiphase mixture that includes a combination of oil, water and gas, are presented. The combination of oil and water may be referred to as a liquid component of the multiphase mixture.

Moreover, the terms 'radio' or 'microwave' frequency range are used to refer to electromagnetic frequencies between hundreds of MHz to several tens of GHz. Furthermore, the term 'multiphase,' as used herein, may be used to refer to a composition that includes at least two phases of materials. The multiphase mixture may include some combination of oil, water, and gas. For example, the composition may include gas and water. In one example, the water may be saline water. In another example, the composition may include gas and oil. Also, the term 'pipe,' as used herein, refers to any structure that permits a flow of a multiphase mixture. Further, the term pipe is not limited to elements that have a substantially circular cross-section, are substantially closed, or are longitudinal elements.

In accordance with aspects of present disclosure, a composition of a multiphase mixture is measured using one or more patch antennas operating in the radio frequency (RF)/microwave frequency range. It may be noted that the terms patch antenna, patch sensor, and patch probe may be used interchangeably. The term 'patch antenna,' as used herein, may be used to refer to a transmitting and/or receiving element that is capable of operating at radio frequencies/microwave frequencies. The patch antenna may include one or more metal patches over a ground plane, where the one or more metal patches and the ground plane are separated by one or more dielectric layers or one or more substrates. In one embodiment, the substrates may be flexible, thereby allowing the substrate to conform to a pipe surface. Moreover, the substrate may be designed in such a manner to ensure that the flow of the fluid mixture is not disturbed. In one example, the patch antenna may include a microstrip patch. The microstrip patch is representative of a metal patch that is printed onto the dielectric layer. Microstrip patches have the advantage of being lightweight, inexpensive and easy to integrate with other electronics. Further, the patch antennas may include a protective cover. This protective cover may also be referred to as a 'radome/superstrate.' In certain scenarios where superstrate is used, the patch antenna may be recessed from the pipe wall and the superstrate may be designed to conform to the pipe wall so as to avoid protrusion into the flow.

In one example, the multiphase mixture may flow through a pipe and the patch antennas may be disposed in close proximity to the pipe. In the case of a metallic pipe, the patch antennas may be disposed on the inner surface of the pipe. However, in the case of a non-metallic pipe/spool, the patch antennas may be disposed on the outer surface of the pipe.

In one example, the patch antennas may be disposed on the outer surface of the pipe by employing a strap-on mechanism.

Typically, low frequency measurements entail use of electrodes in addition to sensors operating in the RF/microwave frequency range. In accordance with aspects of the present disclosure, the patch antennas may also be configured to serve as electrodes for low frequency measurements. Use of patch antennas as electrodes aids in reducing a foot print of the sensors along the pipe in scenarios where low frequency measurements are desirable.

In accordance with further aspects of the present disclosure, in one embodiment, one or more configurations of patch antennas may be used for amplitude/phase angle measurements of transmitted and/or reflected signals. Furthermore, an array of patch antennas may provide a tomographic reconstruction of the multiphase mixture flowing inside the pipe.

FIG. 1 depicts a diagrammatical representation 100 of a multiphase flow measurement system, according to aspects of the present disclosure. The system 100 includes an electromagnetic sensor. In the example of FIG. 1, the electromagnetic sensor may include one or more patch antennas 102. The patch antennas 102 may be disposed on a pipe 104. In particular, the patch antennas 102 may be placed in close proximity to a multiphase mixture 105 flowing through the pipe 104. The patch antennas 102 may be excited over a range of frequencies. The range of frequencies may include a range of radio frequencies, a range of microwave frequencies, or combinations thereof. By way of example, the range of frequencies may range from about 1000 MHz to about 3000 MHz.

The system 100 may also include an electromagnetic frequency generation and reception (EMFGR) unit 106. The EMFGR unit 106 may be configured to excite one or more patch antennas 102 over the range of frequencies. The EMFGR unit 106 may include an electronic device. In one non-limiting example, the electronic device may include a vector network analyzer. Furthermore, in one embodiment, the EMFGR unit 106 may be operatively coupled to a controller 108. The controller 108 may be configured to control the operation of the EMFGR unit 106. In a presently contemplated configuration, the controller 108 may include a processing unit 110 and a graphical user interface 112. In one example, the graphical user interface 112 may include a display unit. In one example, the graphical user interface 112 may be configured to display the data processed by the processing unit 110.

As will be appreciated, an electrical network may be represented by S-parameters and may have at least two ports. The ports are points at which electrical signals either enter and/or exit the electrical network. Furthermore, the S-parameter may be represented by a unit-less complex number that represents a magnitude and an angle, such as an amplitude and a phase angle. A two-port electrical network may be represented by the S-parameters $S_{11}$, $S_{12}$, $S_{21}$, and $S_{22}$.

In accordance with aspects of the present disclosure, the multiphase flow measurement system 100 having the patch antennas 102 may be configured to operate as a two-port electrical network. In this example, the patch antennas 102 may be coupled to corresponding ports of the two-port network. According to aspects of the present disclosure, the patch antennas 102 may be excited over the range of frequencies via use of an incident signal generated by the EMFGR unit 106. The incident signal is representative of a signal which is provided as an input to a port by the EMFGR unit 106. Exciting the patch antennas 102 by the incident signal may result in transmission of a signal and/or reflection of a signal at the ports of the two-port network. Accordingly, transmitted and/or reflected signals may be acquired at the ports. The term 'transmitted' and 'reflected' signals as used herein may be used to refer to transmitted/reflected electrical signals, such as, but not limited to, a transmitted/reflected voltage signal, a transmitted/reflected current signal, a transmitted/reflected power signal, and the like. In one example, the electrical signals may be electromagnetic waves. The electronic device of the EMFGR unit 106 may be configured to measure S-parameters corresponding to the transmitted signal and the reflected signal at the ports. The controller 108 may be configured to determine the amplitude and the phase angle corresponding to the transmitted signal and the reflected signal based on the S-parameters.

As noted hereinabove, the multiphase flow measurement system 100 having the patch antennas 102 may be configured to operate as a two-port electrical network. Accordingly, the multiphase flow measurement system 100 may be represented by a corresponding set of S-parameters. Further, the S-parameters corresponding to the multiphase flow measurement system 100 may be used to derive information about an amplitude and a phase angle of the transmitted and reflected signals at the ports of the two-port network. In one example, the S-parameters may be used to determine the amplitude and the phase angle of the transmitted and reflected signals at the two ports generated in response to an incident signal. The term 'phase angle' may be used to refer to an angle of the transmitted and/or reflected signals with respect to the incident signal.

Also, the controller 108 may be configured to compute a group delay based on the phase angles corresponding to the transmitted signal and the reflected signal at different frequencies. The term 'group delay' is used to refer to a change in phase angle with respect to a change in frequency. The determination of the group delay will be explained in greater detail with respect to FIGS. 16 and 17.

Further, the controller 108 may be employed to determine a phase composition of the multiphase mixture based on the amplitude, the phase angle, and the group delay. In one example, determining the phase composition of the multiphase mixture may entail determining a water fraction and a gas fraction of the multiphase mixture. In the present specification, the terms 'water fraction' and 'water cut' may be used interchangeably. Moreover, in the present specification, the terms 'gas fraction' and 'gas volume fraction' may be used interchangeably. As used herein, the term 'phase composition' refers to the water cut and the gas volume fraction of the multiphase mixture. The term 'water cut' is used to refer to a water volume flow rate relative to the total liquid volume flow rate (oil and water) at standard pressure and temperature. Also, the term 'gas volume fraction' (GVF) is used to refer to a parameter which provides a measure of a quantity of gas present in a multiphase mixture. In particular, the GVF refers to a gas volume flow rate relative to the multiphase volume flow rate at a pressure and temperature prevailing in a measurement environment. Both the water cut and the GVF are usually expressed as percentages.

Figure 2:
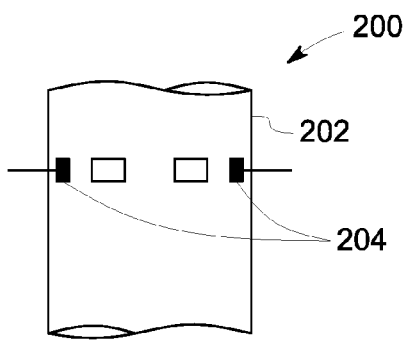
FIGS. 2-5 are diagrammatical representations of various exemplary patch antenna configurations for use in the multiphase flow measurement system of FIG. 1, in accordance with aspects of the present disclosure.

Referring now to FIGS. 2-5, diagrammatical representations of various exemplary patch antenna configurations for use in the multiphase flow measurement system of FIG. 1, in accordance with aspects of the present disclosure, are depicted. FIG. 2 is a diagrammatical representation 200 of an inline patch configuration. The inline patch configuration 200 may include a pipe 202 and one or more patch antennas 204 arranged in a substantially linear configuration. The one or more patch antennas 204 may be arranged such that the patch antennas 202 substantially surround the circumference of the pipe 202. The inline patch configuration 200 may be located, for example, on an inside surface of the pipe 202. The inline patch configuration 200 may be installed within a new pipe prior to use. In other embodiments, the inline patch configuration 200 may be installed in an existing pipe using a spool piece, for instance (for example, during temporary shutdown), thereby offering a retrofit solution.

Figure 3:
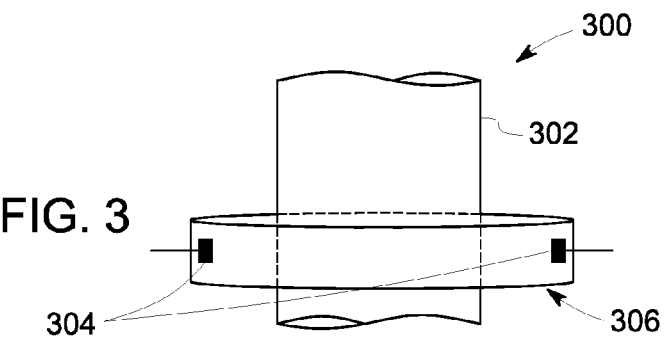

Referring to FIG. 3, a diagrammatical representation 300 of a cavity patch configuration is depicted. The cavity patch configuration 300 may include a pipe 302 and one or more patch antennas 304 arranged such that a cavity exists between the patch antennas 304 and outer surface of the pipe 302. The pipe 302 may be a non-metallic pipe or may have sections that are non-metallic. The patch antennas 304 may include a transmitter antenna and a receiver antenna. In a presently contemplated configuration, the patch antennas 304 may be disposed/arranged on a cavity patch 306. Also, the cavity patch 306 may be installed along a portion of the pipe 302. In one embodiment, one or more portions of the cavity patch 306 may be in physical contact with the pipe 302, while certain other portions may not be in physical contact with the pipe 302. The cavity patch 306 may be installed around a new pipe prior to use. In other embodiments, the cavity patch 306 may be installed around an existing pipe (for example, during temporary shutdown), thereby offering a retrofit solution.

Figure 4:
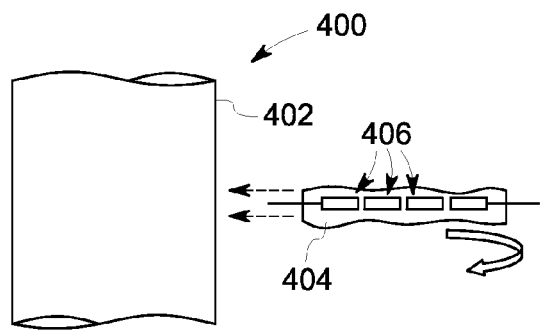

FIG. 4 is a diagrammatical representation 400 of another embodiment of a configuration of patch antennas. This configuration of patch antennas 400 may include a pipe 402 and a patch strap 404. The patch strap 404 may include a plurality of patch antennas 406 disposed thereon. Furthermore, the patch strap 404 may be configured to be installed around an outer surface of the pipe 402. In one example, the patch strap 404 may be wrapped around the pipe 402. The patch strap 404 may be made of any suitable material that allows the patch strap 404 to adequately flex around the circumference of the pipe 402. Typically, the patch strap 404 may be employed in situations where the pipe 402 is non-metallic (for example, plastic, glass, ceramic, and the like) or has sections that are non-metallic. The patch strap 404 having the plurality of patch antennas 406 disposed thereon may be installed along a portion of the pipe 402. The plurality of patch antennas 406 may be configured in a substantially linear arrangement so that the plurality of patch antennas 406 substantially surrounds the pipe 402 when the patch strap 404 is attached to the pipe 402. The patch strap 404 may also be installed around a new pipe 402 prior to use or installed around an existing pipe 402 (for example, during temporary shutdown), thereby offering a retrofit solution.

Figure 5:
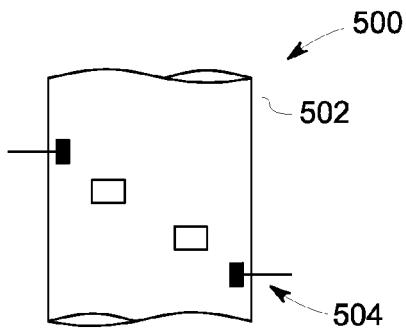

Turning now to FIG. 5, a diagrammatical representation 500 of yet another embodiment of a configuration of patch antennas is presented. The patch antenna configuration 500 in the embodiment of FIG. 5 includes a helical patch configuration. The patch antenna configuration 500 may include a pipe 502 and a plurality of patch antennas 504 arranged in a substantially helical arrangement. The plurality of patch antennas 504 may be configured to substantially surround the circumference of the pipe 502. The helical arrangement of patch antennas 504 may be used, for example, on an inside surface of a metallic pipe 502. In another example, the helical patch configuration of the patch antennas 504 may be used on an outside surface of a non-metallic pipe 502. In yet another example, the helical patch configuration of the patch antennas 504 may be used on a pipe which has sections that are non-metallic. The helical patch configuration may be installed within a new pipe 502 or on the new pipe 502 prior to use. In one example, the helical patch configuration may be installed in or on an existing pipe 502 (for example, during temporary shutdown), thereby offering a retrofit solution. Clearly, other embodiments and configurations of patch antennas may be used without departing from the scope of the present disclosure.

Figure 6:
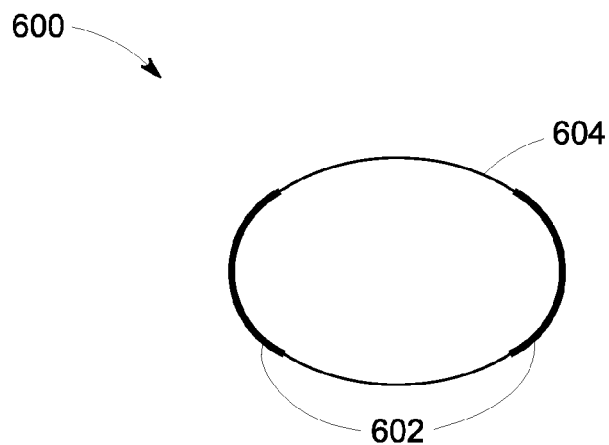
FIGS. 6-8 are diagrammatical representations of cross-sectional views of portions of pipes using the patch antennas of FIGS. 2-5, according to aspects of the present disclosure.
Figure 7:
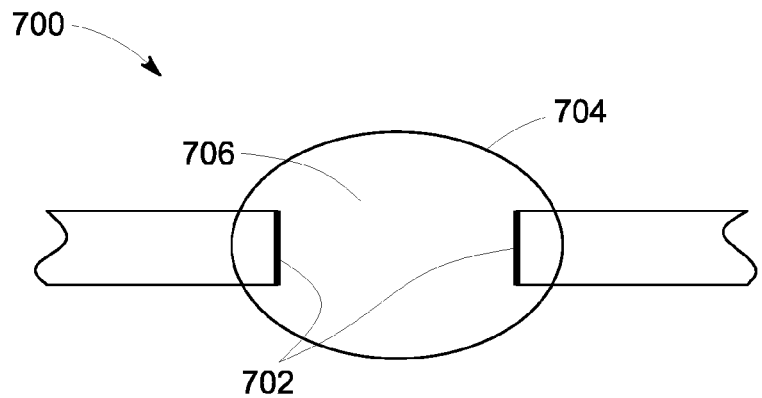
Figure 8:
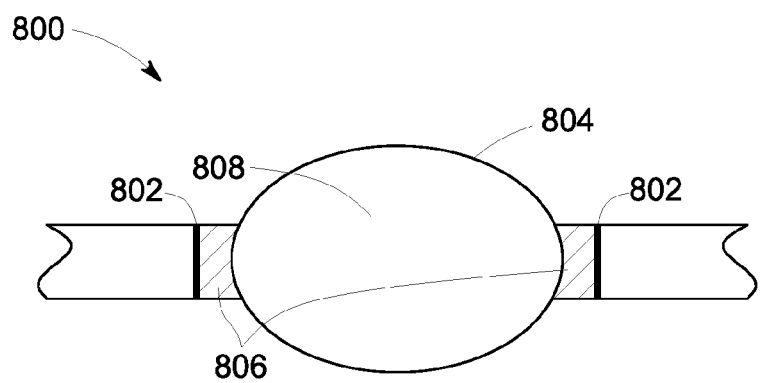

FIGS. 6-8 depict cross-sectional views of a pipe having one or more patch antennas. The pipe may be representative of the pipe 104 of FIG. 1, while the patch antennas may be representative of the patch antennas 102 of FIG. 1. In particular, FIG. 6 is a diagrammatical representation 600 of a cross-sectional view of a pipe 604 having patch antennas 602 disposed thereon. In the example of FIG. 6, the patch antennas 602 are constructed on a flexible substrate, thereby allowing the patch antennas 602 to conform to the shape (for example, curved) of the pipe 604. This embodiment allows close or exact conformance between the shape of the patch antennas 602 and the pipe 604.

FIG. 7 depicts another embodiment of a configuration of patch antennas 700 where patch antennas 702 protrude partially into the interior flow space 706 of a pipe 704. A substrate material of the patch antennas 702 in this embodiment may be rigid.

FIG. 8 depicts another embodiment of a configuration of patch antennas 800 where patch antennas 802 are recessed away from an interior flow space 808 of a pipe 804. A material 806 that is substantially transparent to microwaves may be disposed between the patch antennas 802 and the interior flow space 808 of the pipe 804. In one example, this material 806 may be a protective cover disposed on the patch antenna 802. Furthermore, in one embodiment, the patch antennas 802 may be removably attached to the pipe 804. Other embodiments may be employed using different combinations of the aforementioned features without departing from the scope of the present disclosure.

Figure 9:
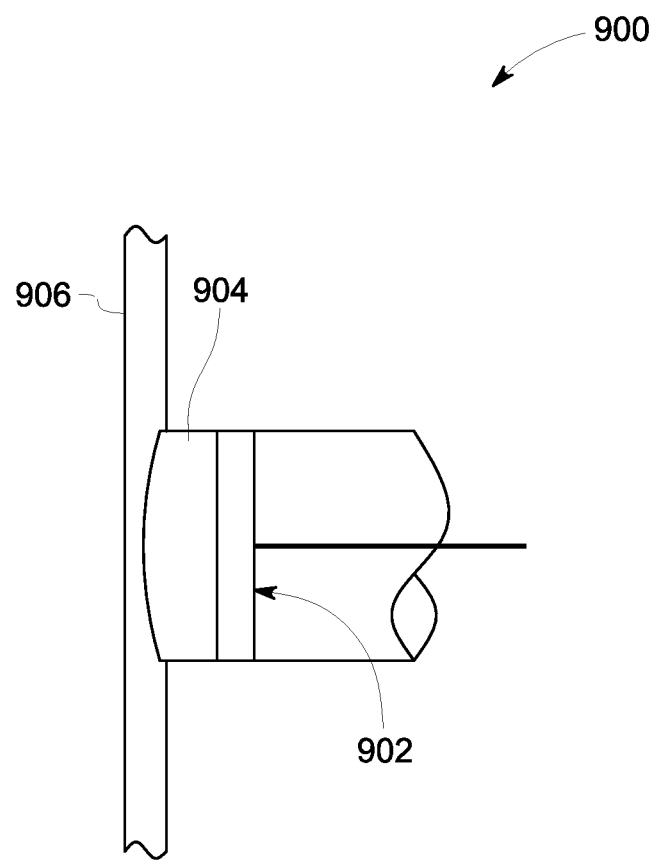
FIG. 9 is a diagrammatical representation of a protective cover of a patch antenna, according to aspects of the present disclosure.

FIG. 9 is a diagrammatical representation 900 of a patch antenna with a protective cover, according to aspects of the present disclosure. Particularly, FIG. 9 depicts one embodiment of a patch antenna 902 having a protective cover 904 around the patch antenna 902. Further, the patch antenna 902 with the protective cover 904 may be positioned on a surface of a pipe 906 that is exposed to a multiphase mixture flowing through the pipe 906. In one example, the protective cover 904 may be disposed on the patch antennas 902 or between the patch antennas 902 and an inner surface of the pipe 906. The protective cover 904 may be made of a dielectric material. Also, the protective cover 904 may be referred to as a radome and may be configured to conform to the surface of the pipe 906 without affecting the flow of multiphase mixture in the pipe 906. In other embodiments, the radome 904 disposed on patch antenna 902 aids in providing additional protection from various factors such as pressure, erosion, corrosion, and the like.

Figure 11:
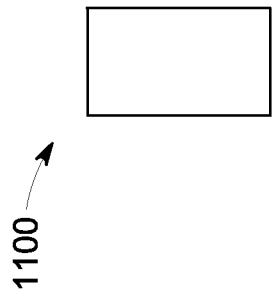
Figure 10:
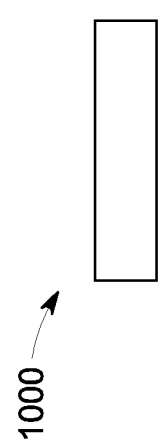
Figure 15:
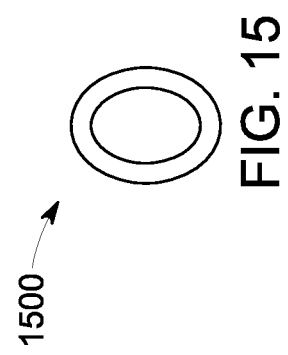

FIGS. 10-15 depict some exemplary shapes of patch antennas, such as the patch antenna 102 of FIG. 1, in accordance with aspects of the present disclosure. The shape of the patch antenna 1000 may be virtually any polygonal shape or combinations thereof. In particular, FIG. 10 is a diagrammatical representation 1000 of one shape of a patch antenna. FIGS. 10 and 11 show patch antennas 1000 and 1100 that are rectangular in shape. A long axis of the rectangular patch antennas 1000, 1100 may be oriented in a plane perpendicular to a pipe axis or along the pipe axis. The long axis is representative of the axis of the patch antenna along the length of the rectangular patch.

Figure 12:
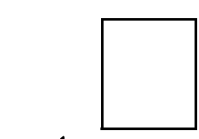
FIGS. 10-15 are diagrammatical representations of various embodiments of a patch antenna, according to aspects of the present disclosure.
Figure 13:
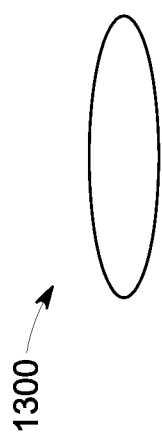

FIG. 12 is a diagrammatical representation 1200 of another shape of a patch antenna. In particular, in FIG. 12 the patch antenna 1200 may have a square shape. Furthermore, FIG. 13 is a diagrammatical representation 1300 of yet another shape of a patch antenna. The patch antenna 1300 of FIG. 13 has an elliptical shape.

Figure 14:
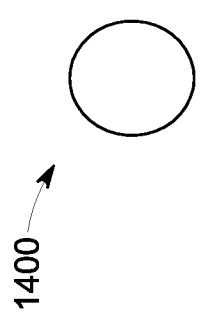

FIG. 14 is a diagrammatical representation 1400 of yet another shape of a patch antenna. In this example, the patch antenna 1400 has a circular shape. Moreover, in the example of FIG. 15 a patch antenna 1500 has a ring shape. Similarly, in addition to the physical shape of the patch antennas, patch antennas with different polarizations may be used. For example, the polarization of the patch antennas may be elliptical, circular, linear, and the like. Use of patch antennas having other shapes and polarizations is also contemplated.

Figure 16:
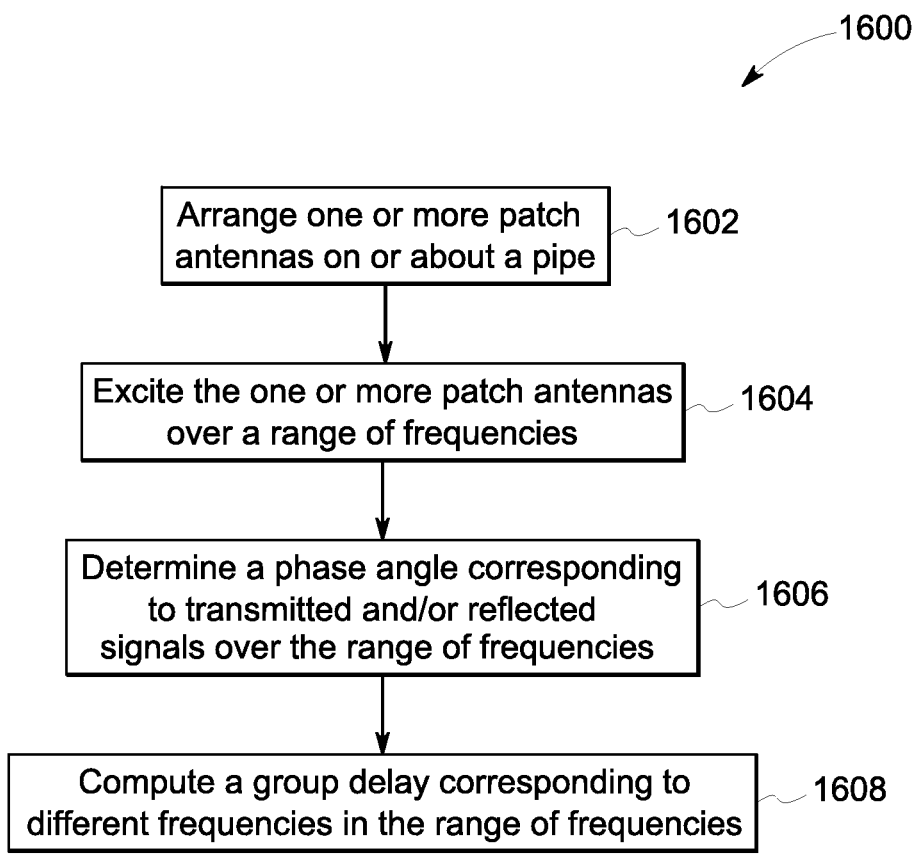
FIG. 16 is a flow chart representing an exemplary method for measuring a group delay in the multiphase flow measurement system of FIG. 1, according to aspects of the present disclosure.

Turning now to FIG. 16, a flow chart 1600 representing an exemplary method for determining a group delay in the multiphase flow measurement system 100 of FIG. 1, according to aspects of the present disclosure, is depicted. As previously noted, the group delay is representative of a change in phase angle with respect to a change in frequency. The method of FIG. 16 will be described with respect to components of FIG. 1.

At step 1602, one or more patch antennas may be arranged on or about a pipe, such as the pipe 104 of FIG. 1. In one embodiment, the patch antennas may be arranged on or about the pipe and proximate to a multiphase mixture flowing through the pipe. Furthermore, at step 1604, the patch antennas, such as the patch antenna 102 may be excited over a range of frequencies. In one example, the range of frequencies may range from about 1000 MHz to about 3000 MHz. The frequency may be swept from about 1000 MHz to about 3000 MHz with a step size of 2 MHz, in one non-limiting example. As noted hereinabove, the patch antennas 102 may be excited over/across a determined range of frequencies via use of an incident signal. The incident signal may be provided by the EMFGR unit 106. As noted hereinabove, multiphase flow measurement system 100 having the patch antennas 102 may be configured to operate as a two-port electrical network. Further, the patch antennas 102 are coupled to a corresponding port of the two-port electrical network. Exciting the patch antennas 102 over the range of frequencies results in the generation of transmitted and/or reflected signals at the ports of the two-port network. Accordingly, the transmitted and/or reflected signals may be acquired at each port.

At step 1606, a phase angle corresponding to the transmitted and/or reflected signals over the range of frequencies may be determined. In one example, where the frequency step size is 2 MHz, phase angles corresponding to the transmitted and/or reflected signals may be determined at frequencies of 1000 MHz, 1002 MHz, 1004 MHz, 1006 MHz, . . . . , 3000 MHz. As previously noted, the phase angle at each frequency may be determined from a corresponding S-parameter.

Furthermore, at step 1608, a group delay $t_g$ corresponding to one or more frequencies may be computed. In particular, the group delay $t_g$ corresponding to the transmitted and/or reflected signals for a given frequency f may be computed based on phase angles $\phi_1$ and $\phi_2$ of the transmitted and/or reflected signals at frequencies $f_1$ and $f_2$ that are adjacent to the given frequency f. By way of example, the group delay $t_g$ corresponding to the transmitted and/or reflected signals for the given frequency f may be computed as indicated by equation (1).

$$t_g = -\frac{d\phi}{d\omega} \quad (1)$$

where ω is representative of angular frequency in radians and may be represented by 2*π*f, and where π has a value of 180 degrees.

Equation (2) may be obtained by substituting ω=2*π*f in equation (1).

$$t_g = -\left(\frac{1}{360}\right)*\left(\frac{d\phi}{df}\right) \quad (2)$$

where φ is representative of a phase angle of transmitted/reflected signals in degrees and f is representative of frequency in Hz.

As indicated by equation (2), the group delay $t_g$ is representative of a change in the phase angle (dφ) with respect to a change in frequency (df). In one example, the change in the phase angle dφ may be represented as:

$$d\phi = (\phi_2 - \phi_1) \quad (3)$$

Also, the change in the frequency df may be represented as:

$$df = (f_2 - f_1) \quad (4)$$

In one example, if the step size is 2 MHz, a group delay corresponding to transmitted and/or reflected signals at a frequency f of 1700 MHz may be computed by employing phase angles $\phi_1$ and $\phi_2$ of the transmitted and/or reflected signals corresponding to a first frequency $f_1$ of 1698 MHz and a phase a second frequency $f_2$ of 1702 MHz. Specifically, the group delay at frequency 1700 MHz may be determined using equations (2)-(4).

Similarly, a group delay corresponding to the transmitted and/or reflected signals at the other frequencies may be computed. In one example, the group delay may be represented as dφ/k, where k is a constant.

Figure 17:
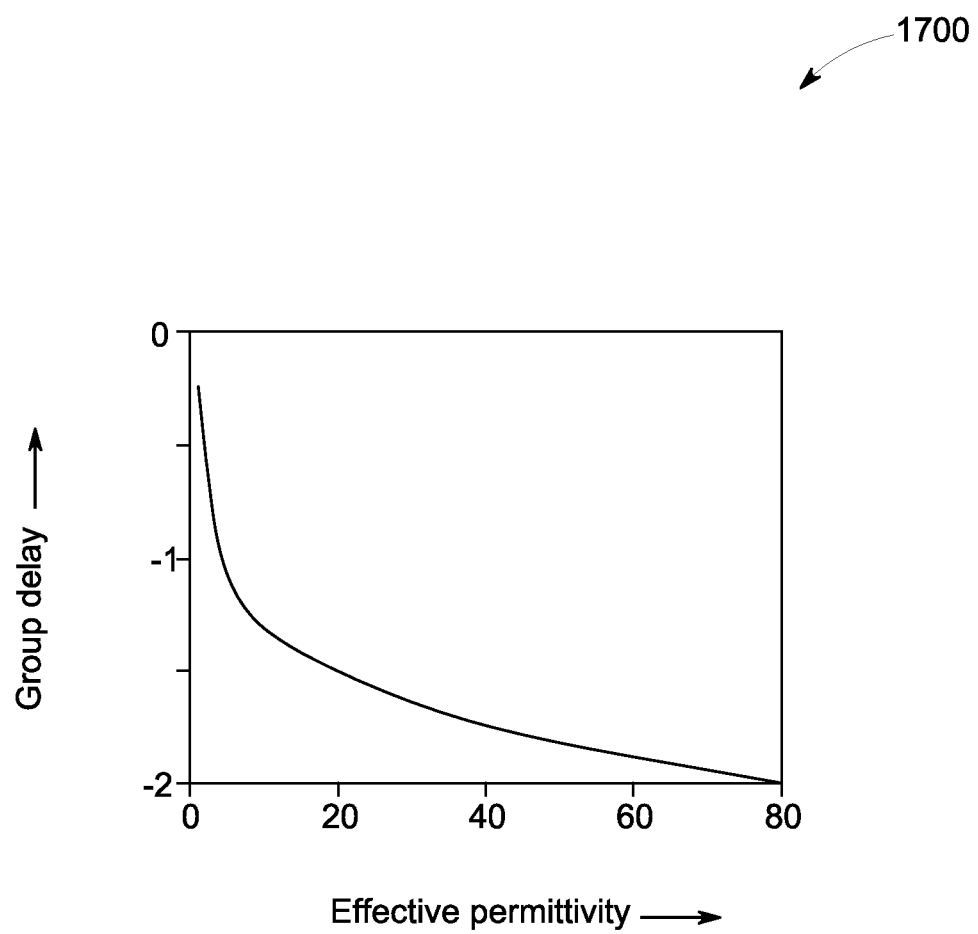
FIG. 17 is a graphical representation depicting a relationship between permittivity and group delay, according to aspects of the present disclosure.

In accordance with aspects of the present disclosure, FIG. 17 represents a graphical representation 1700 of a relation between permittivity of a multiphase mixture and a group delay. Furthermore, for a multiphase mixture having more than one phase (for example, a multiphase mixture having both water and gas) flowing through a pipe, at any instant of time the term 'permittivity' is representative of an effective permittivity of the multiphase mixture flowing through the pipe.

FIG. 17 will be described with respect to the components of FIG. 1. In one example, an electromagnetic (EM) wave may be propagated from an EMFGR unit 106 and traverse through the patch antennas and the multiphase mixture in the pipe and return to the EMFGR unit 106. For EM plane wave propagation, a phase angle of the transmitted signal is proportional to the square root of permittivity of the multiphase mixture through which the wave passes. In a similar manner, a group delay is also proportional to the square root of permittivity of the multiphase mixture through which the wave passes. In accordance with aspects of the present disclosure, for a given value of group delay, a corresponding value of permittivity of the multiphase mixture may be determined. In particular, a group delay or a plurality of group delays corresponding to different frequencies may be employed for determining a permittivity of the multiphase mixture. The permittivity may in turn be used to determine a corresponding water cut of the multiphase mixture. In one example, the water cut may be determined for a given value of permittivity by employing a transfer function that relates the permittivity and the water cut. The relation between the permittivity, group delay and water cut will be explained in greater detail with respect to FIG. 18.

Also, the group delay is representative of a differential phase angle. Therefore, any drift in the phase angle does not affect the group delay. Accordingly, an enhanced quality of measurement of the phase composition of the multiphase mixture is achieved.

Figure 18:
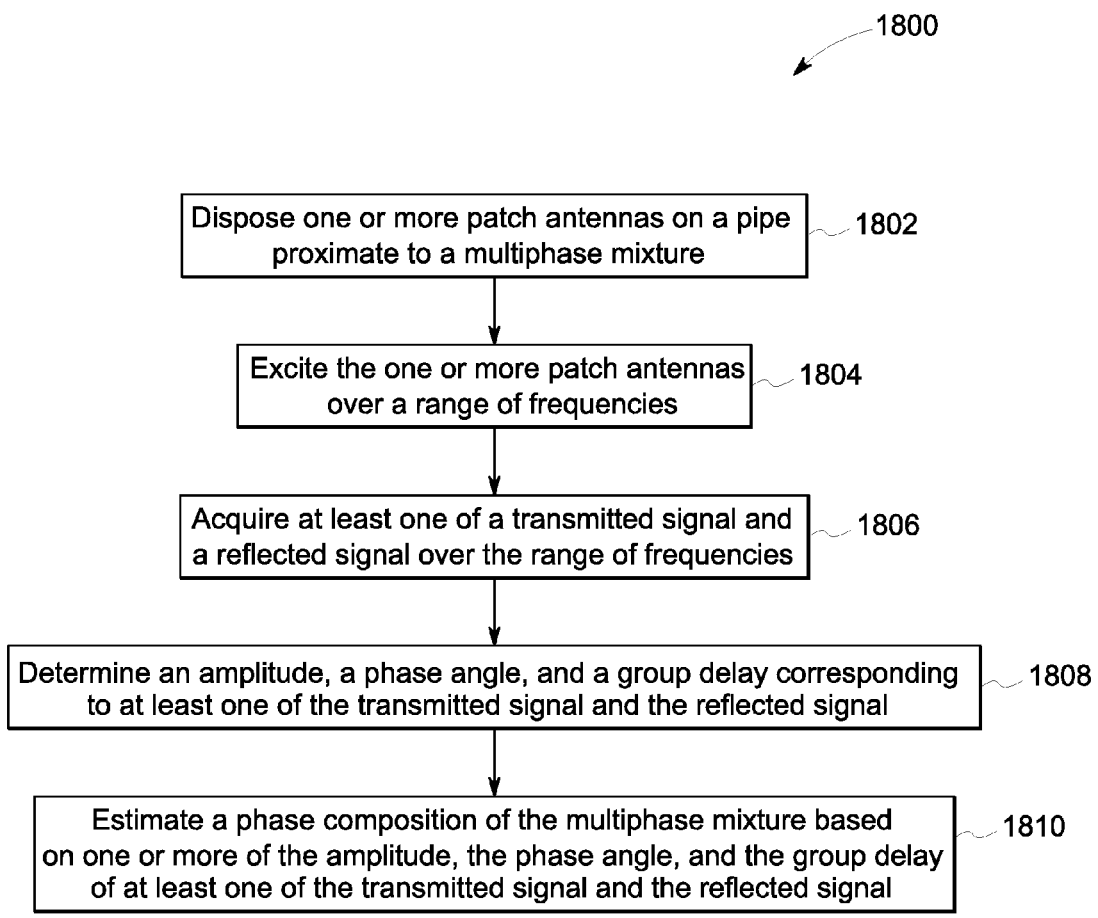
FIG. 18 is a flow chart representing an exemplary method for determining a phase composition using the multiphase flow measurement system of FIG. 1, according to aspects of the present disclosure.

Referring now to FIG. 18, a flow chart 1800 representing an exemplary method for determining a phase composition of a multiphase mixture using the multiphase flow measurement system 100 of FIG. 1, according to aspects of the present disclosure, is presented. The method of claim 18 will be described with reference to the components of FIG. 1. As previously noted, the multiphase mixture 105 may flow through the pipe 104. The method begins at step 1802, where one or more patch antennas are disposed on a pipe proximate to the multiphase mixture. The patch antennas may be disposed on or in the pipe in different configurations. Some examples of the patch antenna configurations are depicted in FIGS. 2-5.

At step 1804, the patch antennas may be excited over a range of frequencies. In one example, the patch antennas may be excited sequentially and/or simultaneously. The range of frequencies may include a range of radio and/or microwave frequencies. In one example, the range of frequencies may vary from about 1000 MHz to about 3000 MHz.

In response to the excitation of the patch antennas 102, transmitted and/or reflected signals may be generated. At step 1806, the transmitted and/or reflected signals corresponding to the range of frequencies may be acquired at the patch antennas. In one example, S-parameters corresponding to the transmitted and/or reflected signals over the range of frequencies may be determined.

Furthermore, at step 1808 an amplitude, a phase angle, a group delay corresponding to the transmitted and/or reflected signals associated with the range of frequencies may be determined based on the S-parameters. At step 1810, a phase composition of the multiphase mixture may be determined based on one or more of the amplitude, the phase angle, and the group delay corresponding to the transmitted and/or reflected signals associated with the range of frequencies. The amplitude, the phase angle, and the group delay corresponding to the transmitted and/or reflected signals may also be referred to as measurands.

In one embodiment, one or more of the amplitude, the phase angle, and the group delay corresponding to the reflected and/or transmitted signals may be processed using regression analysis to obtain a transfer function that relates these measurands to the water cut and/or the gas volume fraction of the multiphase mixture. In another embodiment, one or more of the amplitude, phase angle, and group delay of the reflected and/or transmitted signals may be processed using regression analysis to obtain a transfer function that relates the measurands to the permittivity of the multiphase mixture. Accordingly, the permittivity of the multiphase mixture inside the pipe may be determined based on one or more of the amplitude, phase angle, and group delay of the transmitted and/or reflected signals. As will be appreciated, the permittivity of the multiphase mixture depends upon constituents of the multiphase mixture such as water, gas, and oil. In one example, the transfer function may relate time statistics of one or more of the amplitude, phase angle, and group delay corresponding to the transmitted and/or reflected signals to the permittivity of the multiphase mixture inside the pipe. Some examples of the transfer function include a transfer function corresponding to an oil continuous flow and a transfer function corresponding to a water continuous flow. The term 'oil continuous flow,' as used herein, may be used to refer to a multiphase mixture where water is dispersed in oil. Further, the term 'water continuous flow,' as used herein, may be used to refer to a multiphase mixture where oil is dispersed in water.

Further, the phase composition, and particularly the water cut and the gas volume fraction of the multiphase mixture may be determined based on the permittivity of the multiphase mixture. In the example where the multiphase mixture is a two phase mixture such as a composition of water and oil, the permittivity of the two phase mixture may be a function of water cut, salinity, and temperature. Also, for a three phase mixture, such as a composition of gas, water, and oil, the permittivity of the three phase mixture may be a function of gas volume fraction, water cut, salinity, and temperature.

Additionally, as noted hereinabove, the phase angle may be determined corresponding to the transmitted and/or reflected signals associated with the range of frequencies. In certain scenarios, the phase angle is wrapped between +180 degrees. Accordingly, the magnitude of the phase angle corresponding to the transmitted and/or reflected signals may always vary from −180 to +180 degrees. Hence, in order to determine an unwrapped value of the phase angle, it may be desirable to determine the number of wrappings the phase angle has undergone.

In one embodiment, the group delay may be employed to determine the unwrapped phase angle. In another embodiment, the unwrapped phase angle may be determined based on the group delay and the amplitude of transmitted and/or reflected signals. The unwrapped phase angle may be used to determine the permittivity, the water cut, and/or the gas volume fraction of the multiphase mixture.

FIGS. 19-22 are diagrammatical representations of signatures of a transmitted and/or reflected signal corresponding to different flow regimes, according to aspects of the present disclosure. Particularly, FIGS. 19-22 represent the signatures of a transmitted and/or reflected signal corresponding to different flow regimes obtained at a single frequency. It may be noted that the multiphase mixture flowing in a pipe may have different types of flow regimes. The term 'flow regime,' as used herein, may be used to refer to a flow state that depends on a spatial distribution of gas in a multiphase mixture. For example, the flow regime may be labelled as bubbly if discrete gaseous bubbles exist in a continuous liquid. The flow regime may be labelled as slug if occasional large bubbles flow in a continuous liquid surrounded by smaller bubbles. The flow regime may be labelled as annular flow if there is continuous flow of the liquid component of the multiphase mixture along the walls of the pipe with gas flowing in the core of the pipe. Few other examples of the flow regimes may include a wispy annular flow regime and a churn flow regime.

Figure 19:
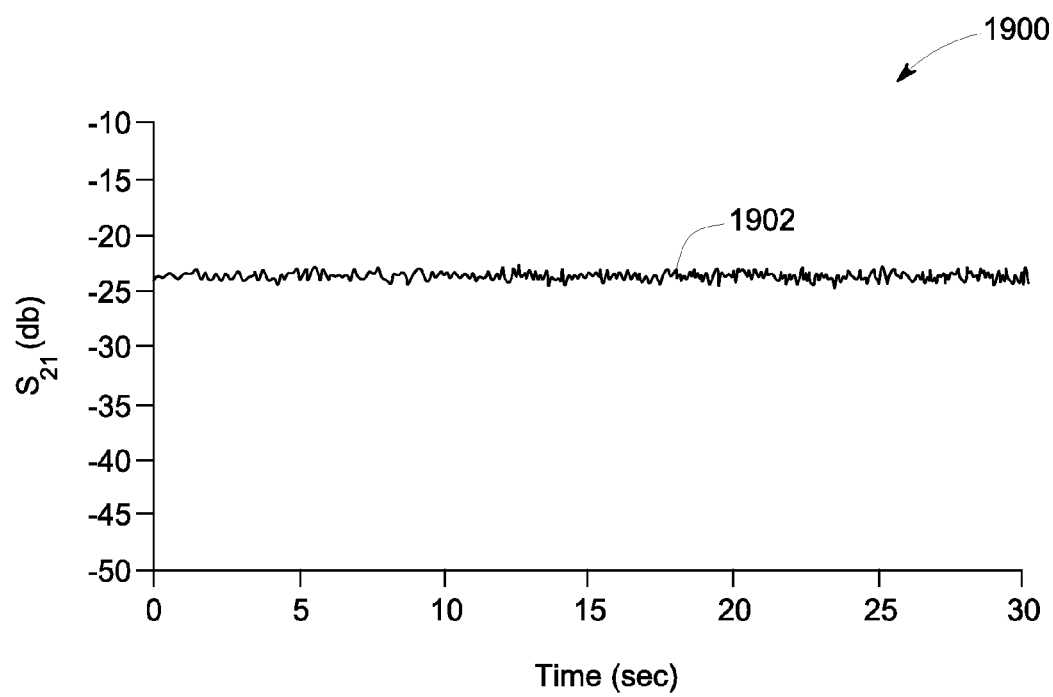
FIGS. 19-22 are diagrammatical representations of signatures of transmitted and/or reflected signals corresponding to different flow regimes, according to aspects of the present disclosure.

Referring to FIG. 19, a diagrammatical representation 1900 of a signature 1902 of a transmitted signal with respect to time is depicted. Specifically, in FIG. 19, an S-parameter $S_{21}$ corresponding to an amplitude of the transmitted signal is represented on the Y-axis and time is represented on the X-axis. It may be noted that $S_{21}$ indicates a signal measured at a second port on a pipe due to an excitation at a first port, where the first and second ports represent two ports of a two-port network. In accordance with aspects of present disclosure, patch antennas may be coupled to the first and second ports. FIG. 19 depicts the signature 1902 of the transmitted signal in a multiphase mixture having a water cut percentage of 21% and a GVF percentage of 0%. In this scenario, the signature 1902 of the transmitted signal is almost constant with time since no gas is present and the multiphase mixture in the pipe is homogenous.

Figure 20:
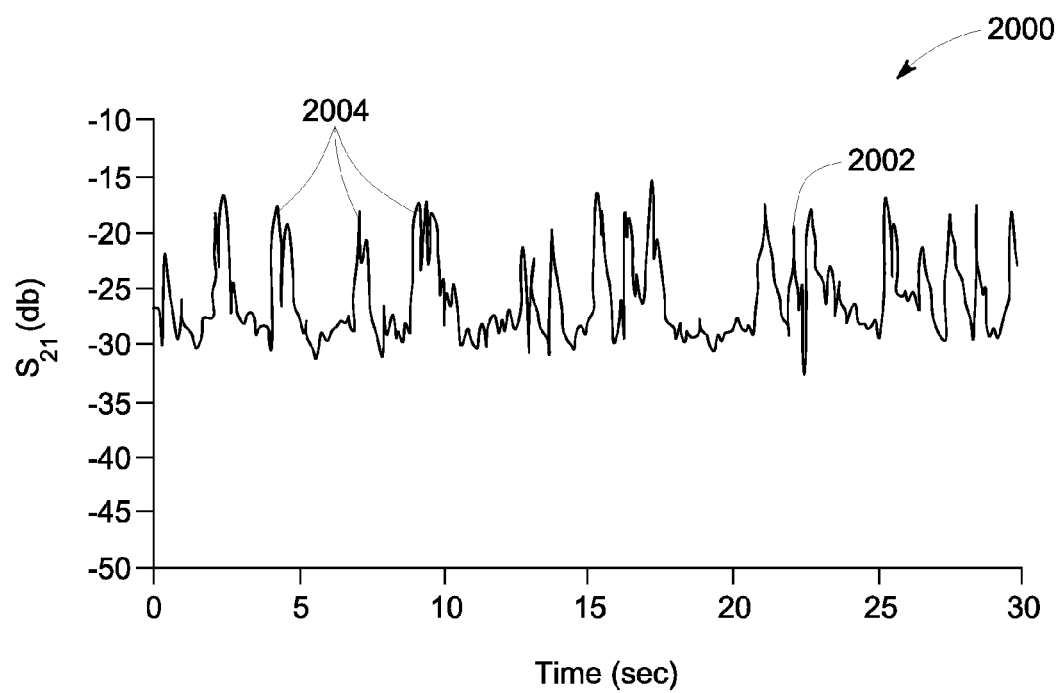

Similarly, FIG. 20 is a diagrammatical representation 2000 of a signature 2002 of a transmitted signal corresponding to a multiphase mixture having about 18% gas and about 82% liquid, of which about 20% is water and the remaining percentage is oil. As depicted in FIG. 20, deviations for short durations of time are indicative of presence of gas in the multiphase mixture. In the example of FIG. 20, higher amplitude intervals 2004 of the signature 2002 correspond to gas. The signature 2002 of FIG. 20 is representative of a slug flow regime.

Figure 21:
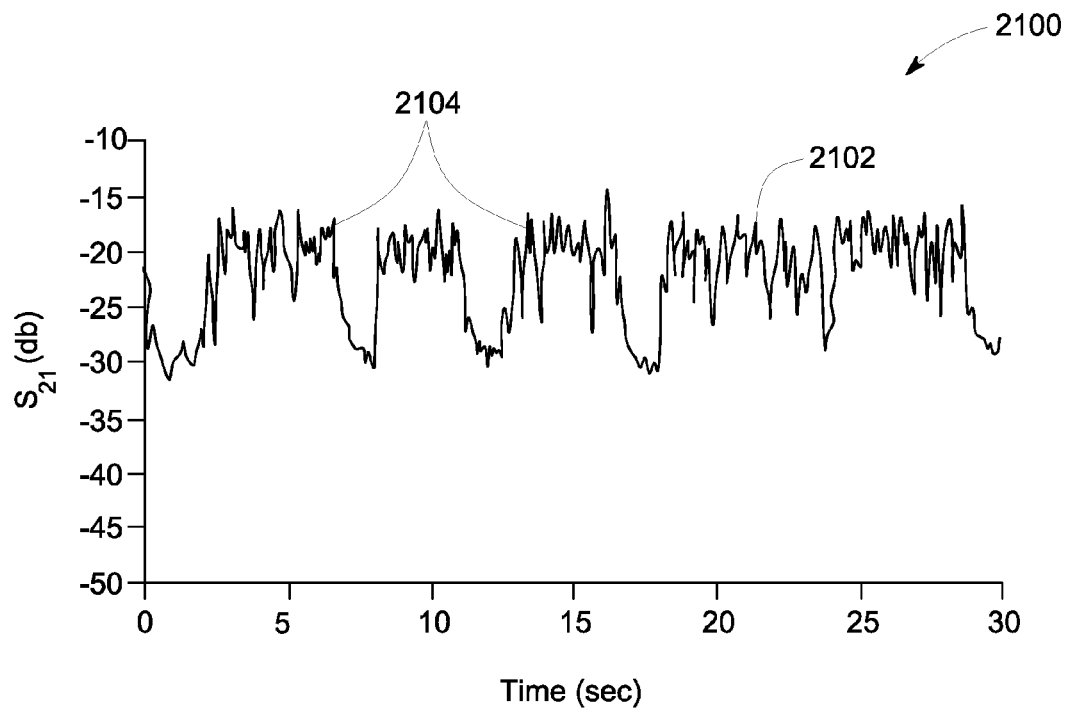

In a similar manner, FIG. 21 is a diagrammatical representation 2100 of a signature 2102 of a transmitted signal corresponding to a multiphase mixture having about 51% gas and about 49% liquid of which about 20% is water and the remaining percentage is oil. In FIG. 21, the signature 2102 depicts longer durations of higher amplitude intervals 2104 that are indicative of larger bubbles (longer slugs) in the multiphase mixture when compared to the multiphase mixture of the example of FIG. 20.

Figure 22:
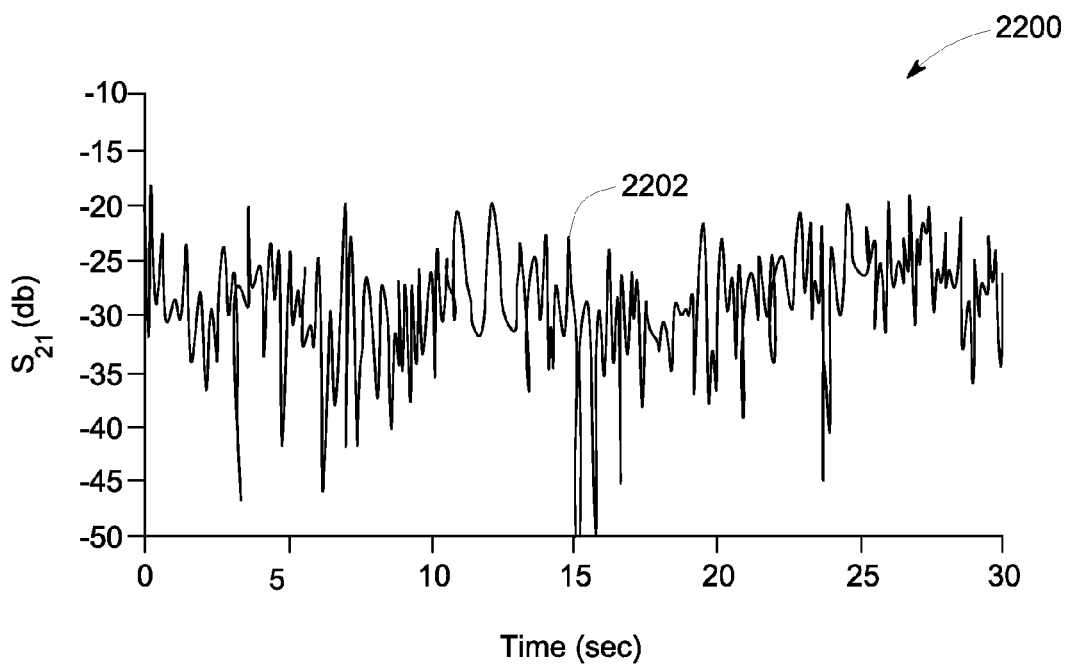

FIG. 22 is a diagrammatical representation 2200 of a signature 2202 of a transmitted signal corresponding to a multiphase mixture having about 75% gas and about 25% liquid. As depicted in FIG. 22, larger deviations of high frequency are indicative of the presence of relatively higher percentage of gas when compared to the multiphase mixtures studied in the examples of FIGS. 19-21.

It may be observed that each flow regime has a corresponding unique/distinct signature. Accordingly, in one embodiment, the signatures corresponding to the transmitted signals shown in FIGS. 19-22 may be mathematically transformed to identify a particular flow regime. The mathematical transformation may include obtaining statistical parameters such as a standard deviation, a kurtosis, a mean, a variance, a median and the like, of the transmitted signals by using techniques such as, but not limited to, principal component analysis (PCA). These statistical parameters corresponding to the different signatures of the transmitted signals may be stored in a data repository. Also, the stored statistical parameters may be employed for classifying the signatures. Based on the identification of the type of flow regime, different transfer functions may be used to determine the phase composition of the multiphase mixture.

Figure 23:
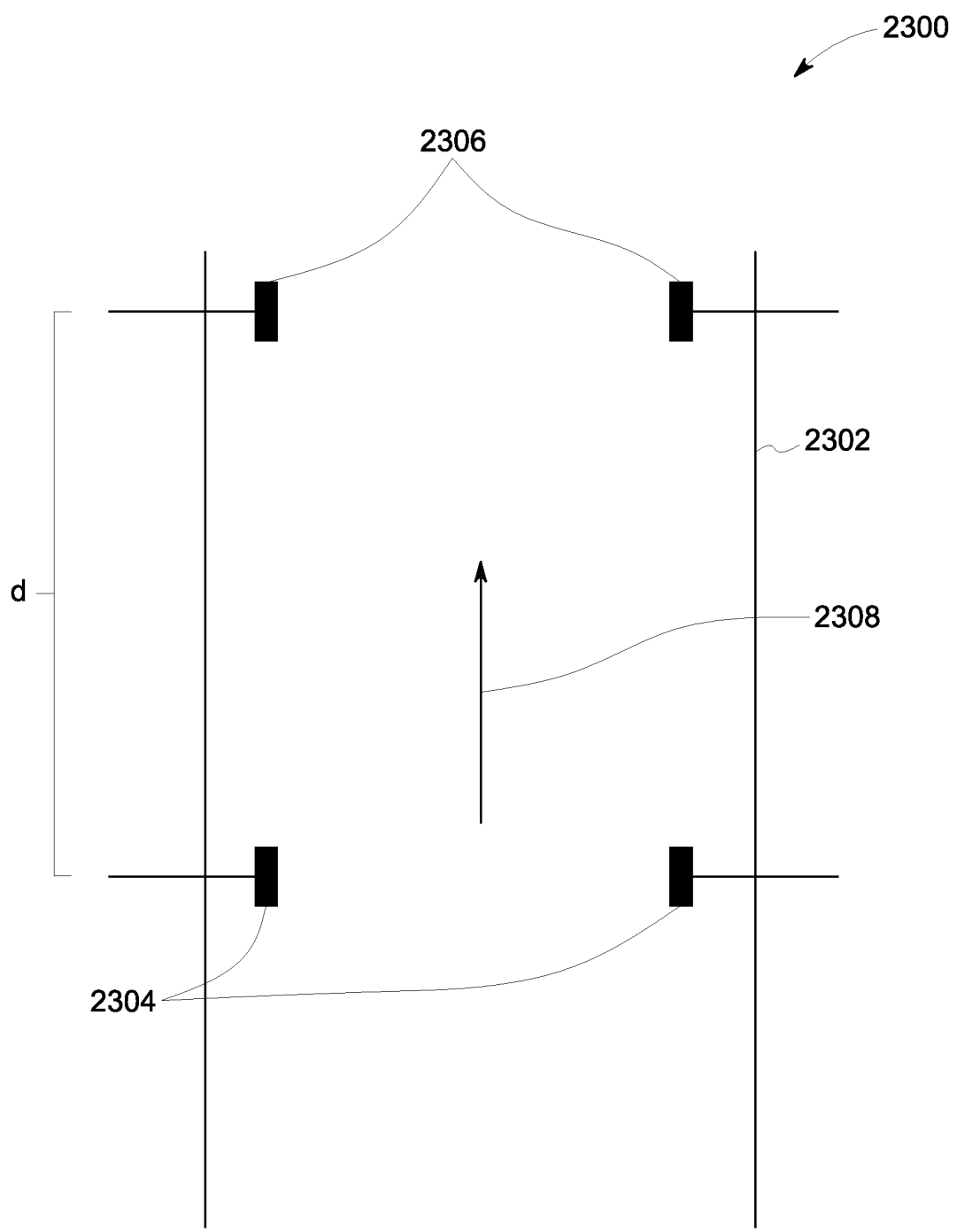
FIG. 23 is a diagrammatical representation of measurement of velocity of a multiphase mixture flowing in a pipe, according to aspects of the present disclosure.

Turning now to FIG. 23, a diagrammatical representation 2300 of a system for measuring a velocity of a multiphase mixture flowing in a pipe is depicted. The system 2300 of FIG. 23 may include a pipe 2302. Furthermore, at least two sets of patch antennas 2304, 2306 may be disposed axially along the pipe 2302. In particular, one patch antenna set 2304 is placed axially at a distance 'd' from the other patch antenna set 2306. In the example of FIG. 23, the patch antenna sets 2304, 2306 may each include at least one patch antenna. The patch antenna sets 2304, 2306 may be excited over a range of frequencies. As noted hereinabove, the range of frequencies varies from about 1000 MHz to about 3000 MHz. Based on the excitation of the patch antenna sets, transmitted and reflected signals at the patch antennas sets 2304, 2306 may be measured over the range of frequencies. In particular, the power of the transmitted and reflected signals at the patch antennas sets 2304, 2306 may be measured over the range of frequencies. Also, a velocity of flow of the multiphase mixture may be estimated based on the signals measured at the two sets of patch antennas 2304, 2306 by employing a cross-correlation technique. Reference numeral 2308 may be representative of a direction of flow of the multiphase mixture.

The transmitted and/or reflected signals measured at the patch antenna set 2306 may be shifted in time by Δt when compared to the transmitted and/or reflected signals measured at the patch antenna set 2304. Using the distance 'd' between the two patch antenna sets 2304, 2306 and the time Δt, the velocity of flow of the multiphase mixture in the pipe 2302 may be estimated.

Additionally, in certain situations, the multiphase mixture may include highly saline water, which leads to restrictions on the transmission of radio and/or microwave frequencies in the highly saline water due to higher losses. In this example, the patch antennas may be excited over a lower range of frequencies. In one example, the lower range of frequencies may vary from about 1 KHz to about 10 MHz. In this embodiment, the patch antennas may operate as electrodes, thereby obviating the need for a separate set of electrodes. The use of patch antennas as electrodes aids in reducing sensor footprint. In another embodiment, the EMFRG unit 106 of FIG. 1 may be employed to excite the patch antennas over the lower range of frequencies. As previously noted, the EMFRG unit 106 is configured to excite the patch antenna over a higher range of frequencies such as 1000 MHz to 3000 MHz. In order to accommodate the excitation of the patch antenna at the lower range of frequencies, the EMFRG unit may include switchable circuitry to switch between the high and low range of frequencies.

Furthermore, a low frequency impedance of a multiphase mixture may be measured when the patch antennas are excited at lower range of frequencies. In one example, Electrical Impedance Spectroscopy (EIS) may be employed to measure the low frequency impedance of the multiphase mixture. The measured low frequency impedance may be employed to estimate a conductivity and/or a permittivity of the multiphase mixture. Further, the estimated conductivity and/or permittivity may be used to estimate a phase composition of the multiphase mixture. In particular, water cut and gas volume fraction of the multiphase mixture may be determined by employing the estimated conductivity and/or permittivity. Additionally, in another embodiment, an array of patch antennas may be used for tomographic reconstruction. For example, the array of patch antennas may be placed circumferentially around the pipe so as to generate a tomographic image.

Furthermore, the foregoing examples, demonstrations, and process steps such as those that may be performed by the system may be implemented by suitable code on a processor-based system, such as a general-purpose or special-purpose computer. It should also be noted that different implementations of the present specification may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the system and method for determining a phase composition of a multiphase mixture described hereinabove aid in providing a non-intrusive technique for measuring the phase composition of the multiphase mixture. Also, use of group delay for determining the phase composition of the multiphase mixture aids in obtaining the measurement of the phase composition of the multiphase mixture which is impervious to any drift in the phase angle of the transmitted/reflected signals. Accordingly, use of the group delay for determining the phase composition of multiphase mixture results in a robust technique for determining the phase composition of the multiphase mixture. Also, the system and method presented hereinabove obviate the need for diverting or disturbing the flow of the multiphase mixture to measure the phase composition of the multiphase mixture. Furthermore, since the patch antennas also function as electrodes at lower frequencies, the sensor footprint on the pipe may be reduced. Moreover, use of the low frequency impedance for determining the phase composition aids in measuring the phase composition of saline water compositions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a phase composition of a multiphase mixture flowing through a pipe, the method comprising:
   exciting one or more patch antennas configured to operate over a range of frequencies;
   acquiring a transmitted signal and a reflected signal over the range of frequencies from the one or more patch antennas; and
   estimating the phase composition of the multiphase mixture based on a group delay;
   wherein the group delay corresponding to transmitted and reflected signals for a given frequency is determined based on first and second phase angles of the transmitted and reflected signals at first and second frequencies that are adjacent to the given frequency.

2. The method of claim 1, wherein exciting the one or more patch antennas comprises:
   generating at least one of the transmitted signal and the reflected signal based on the excitation of the one or more patch antennas; and
   determining an amplitude, a phase angle, the group delay, or combinations thereof of at least one of the transmitted signal and the reflected signal.

3. The method of claim 2, wherein estimating the phase composition of the multiphase mixture further comprises determining the phase composition based on the amplitude, the phase angle, or a combination thereof of at least one of the transmitted signal and the reflected signal.

4. The method of claim 3, further comprising determining an unwrapped phase angle of at least one of the transmitted signal and the reflected signal based on the group delay, the amplitude, or a combination thereof.

5. The method of claim 2, further comprising determining a permittivity of the multiphase mixture based on at least one of the group delay, the amplitude, and the phase angle of at least one of the transmitted signal and the reflected signal.

6. The method of claim 5, wherein estimating the phase composition of the multiphase mixture comprises determining the phase composition based on the permittivity of the multiphase mixture.

7. The method of claim 1, wherein estimating the phase composition of the multiphase mixture comprises:
   determining at least one of a signature of the transmitted signal and a signature of the reflected signal;
   estimating a flow regime of the multiphase mixture based on at least one of the signature of the transmitted signal and the signature of the reflected signal; and
   determining the phase composition of the multiphase mixture based on the flow regime.

8. The method of claim 7, wherein estimating the flow regime of the multiphase mixture comprises analyzing a plurality of statistical parameters corresponding to the signature of at least one of the transmitted signal and the reflected signal.

9. The method of claim 1, further comprising disposing the one or more patch antennas proximate to the multiphase mixture.

10. The method of claim 1, further comprising disposing a protective cover on the one or more patch antennas.

11. The method of claim 1, wherein the one or more patch antennas have a rectangular shape, a circular shape, a ring shape, a diamond shape, an elliptical shape, a square shape, or combinations thereof.

12. The method of claim 1, wherein the range of frequencies is from about 1000 MHz to about 3000 MHz with a step size of 2 MHz.

13. A system for determining a phase composition of a multiphase mixture flowing through a pipe, the system comprising:
   one or more patch antennas disposed on or about the pipe;
   a controller configured to:
      excite the one or more patch antennas at one or more frequencies;
      acquire a transmitted signal and a reflected signal corresponding to the one or more frequencies; and
      estimate the phase composition of the multiphase mixture based on a group delay;
   wherein the group delay corresponding to transmitted and reflected signals for a given frequency is determined based on first and second phase angles of the transmitted and reflected signals at first and second frequencies that are adjacent to the given frequency.

14. The system of claim 13, wherein the one or more patch antennas are disposed on an exterior surface of the pipe.

15. The system of claim 13, wherein the one or more patch antennas are configured to conform to a surface of the pipe.

16. The system of claim 13, wherein the one or more patch antennas are arranged such that the one or more patch antennas are recessed away from an interior flow space of the pipe.

17. The system of claim 13, wherein the one or more patch antennas are arranged such that the one or more patch antennas protrude into a portion of an interior flow space of the pipe.

18. The system of claim 13, wherein the one or more patch antennas comprise electromagnetic sensors.

19. The system of claim 13, further comprising a protective cover disposed on the one or more patch antennas.

* * * * *